March 14, 1950 D. C. ROCKOLA 2,500,381
INDICATOR
Filed Aug. 17, 1945 3 Sheets-Sheet 1
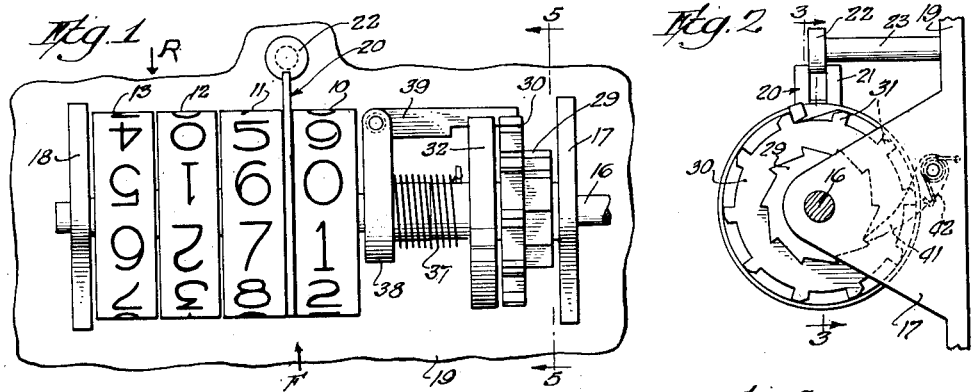
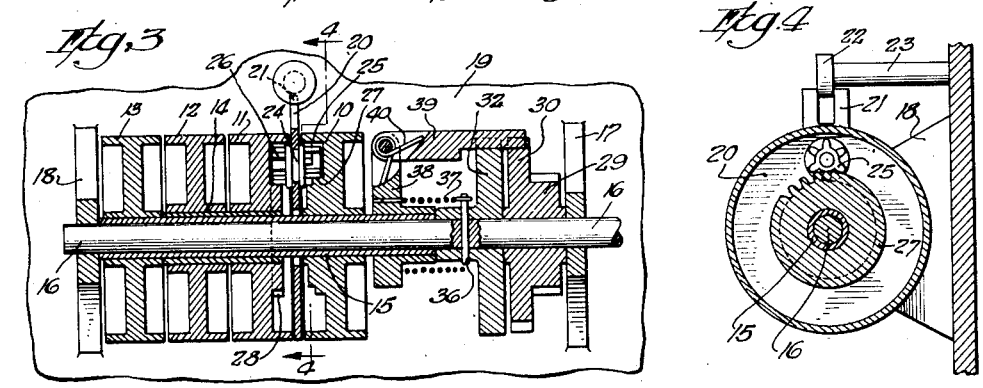
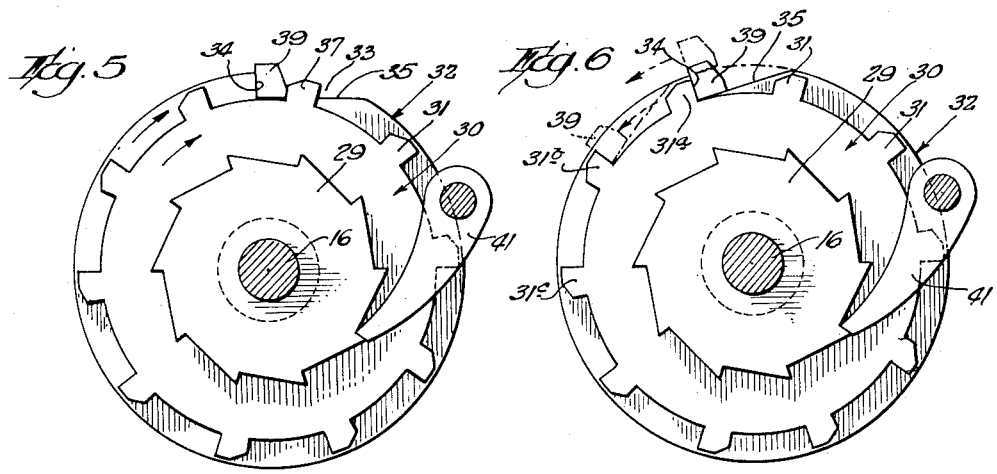
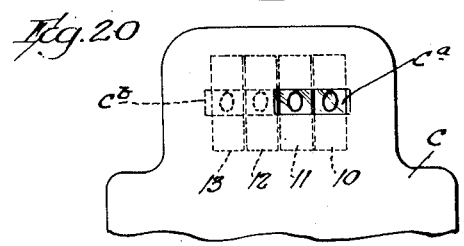
Inventor
David C. Rockola

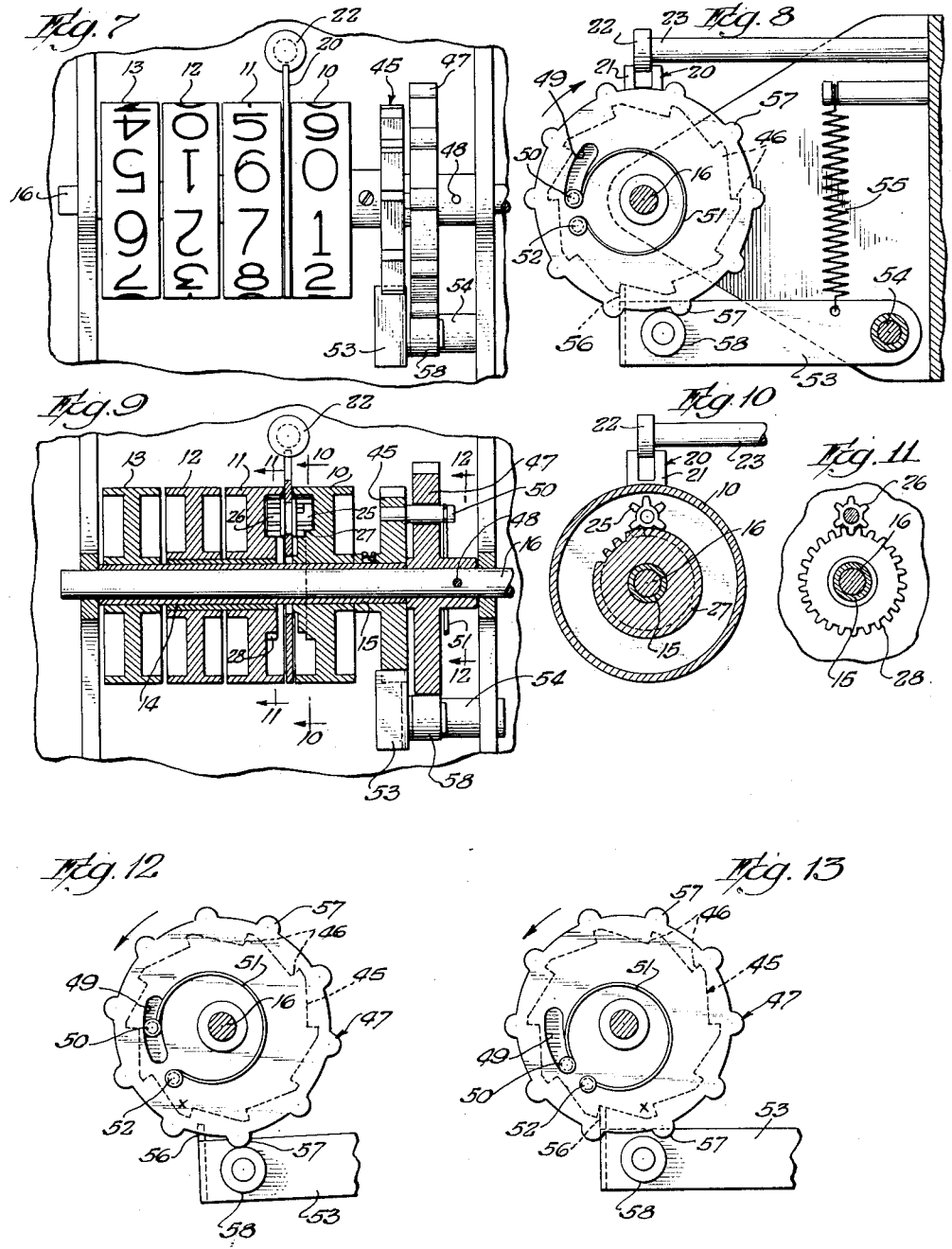

March 14, 1950 — D. C. ROCKOLA — 2,500,381
INDICATOR
Filed Aug. 17, 1945 — 3 Sheets-Sheet 3
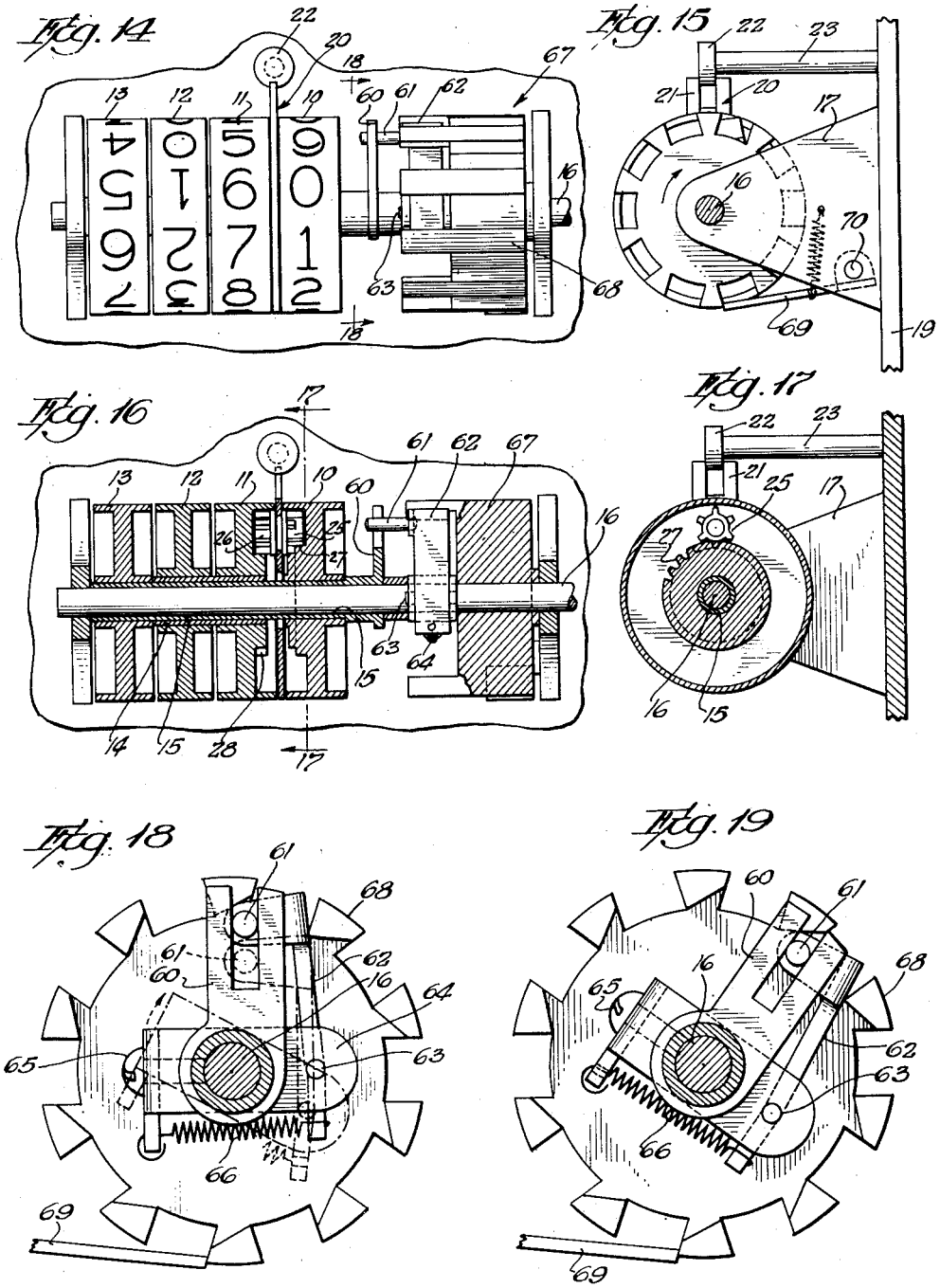
Inventor:
David C. Rockola
By Sheridan, Davis & Cargill
Attys.

Patented Mar. 14, 1950

2,500,381

UNITED STATES PATENT OFFICE 2,500,381

INDICATOR

David C. Rockola, Chicago, Ill., assignor, by mesne assignments, to The Rock-Ola Manufacturing Corporation, Chicago, Ill., a corporation of Delaware Application August 17, 1945, Serial No. 611,085

8 Claims. (Cl. 235—117)

This invention relates to improvements in indicators.

One object of the invention is to provide a dual indication for displaying the measured result of a single or of several actuations of an actuating element.

Another object of the invention is to provide a rotary indicator having numeral or other indicia bearing wheels or discs, that are operable by a single actuating element for the dual display of the numerical result of both forward and rearward operations of said element.

An additional object of the invention is to provide actuating mechanism for an indicator bearing units of measurement, and comprising structure whereby the indicator is operable forwardly and rearwardly for incrementally and decrementally varying an indicated value or, in other words, whereby the indicator is operable to indicate values increasing from zero to a maximum value as well as values decreasing from the maximum to zero.

An indicator constructed in accordance with the present invention, if used on parking meters, for example, will indicate dually, as from both the front and rear of the indicator, a gross authorized parking period upon an initial energization of the meter and will indicate the net or remaining balance of the period during all portions of the parking period. The invention may likewise be embodied in apparatus adapted to be used as a time indicator for traffic signals at traffic controlled intersections whereby upon change of a signal from "stop" to "go" or vice versa for illustration, the structure will indicate from two directions the total time of the period initially as well as the progressively decreasing balance of the period during the lapsing thereof.

Other uses of the improved mechanism will be apparent from a consideration of the following specification and accompanying drawings, wherein:

Fig. 1 is a top plan view of mechanism illustrative of the present invention.

Fig. 2 is an end elevation of the structure shown in Fig. 1.

Fig. 3 is a sectional view taken on line 3—3 of Fig. 2.

Fig. 4 is a sectional view taken on line 4—4 of Fig. 3.

Fig. 5 is an enlarged sectional view taken on line 5—5 of Fig. 1, showing the relative positions of certain actuating parts of the mechanism when rotated in the clockwise direction as indicated by the arrows.

Fig. 6 is a view similar to Fig. 5, but showing the associated parts of the actuating means in different relative positions effected by rotation of the shaft in a counter-clockwise direction.

Fig. 7 is a top plan view of an indicating device similar to that shown in Figs. 1 to 4 but provided with modified actuating mechanism.

Fig. 8 is an end elevation of the structure shown in Fig. 7.

Fig. 9 is a sectional view taken on line 9—9 of Fig. 8.

Fig. 10 is a sectional view taken on line 10—10 of Fig. 9.

Fig. 11 is a sectional view taken on line 11—11 of Fig. 9.

Fig. 12 is a sectional view taken on line 12—12 of Fig. 9.

Fig. 13 is a view similar to Fig. 12, but showing the parts in different relative positions.

Fig. 14 is a plan view of an indicator having another form of actuating mechanism.

Fig. 15 is an end view of the structure shown in Fig. 14.

Fig. 16 is a sectional view taken on line 16—16 of Fig. 15.

Fig. 17 is a sectional view taken on line 17—17 of Fig. 16.

Fig. 18 is an enlarged sectional view taken on line 18—18 of Fig. 14.

Fig. 19 is a view similar to Fig. 18, but showing the parts in different relative positions.

Fig. 20 is a broken elevation of a casing of a mechanism in association with which the improved indicating apparatus may be employed.

In Figs. 1 to 6 of the drawings the indicator is shown as comprising four numerals wheels 10, 11, 12 and 13. As illustrated in Fig. 1, the wheels are divided into ten equal parts which bear indicia 0–9. Wheels 10 and 11 may be considered as constituting a cooperative pair, while wheels 12 and 13 constitute a second cooperative pair. The first mentioned pair of wheels exhibits or displays the indicia thereon when viewed from one side of the device as when viewed in the direction of the arrow F or front side, while the second pair is designed to display the indicia thereon when viewed from the other, or rear side of the device, that is, when viewed in the direction of arrow R.

When the apparatus is embodied in appropriate mechanism requiring the indication of values, such as a parking meter, for example, a casing or enclosure C (see Fig. 20) is provided for the indicator mechanism. The casing will have a front sight opening $c^a$, as shown, through which may be viewed aligned indicia of wheels 10 and 11 and a similar but laterally offset rear sight opening c^b on the opposite side of the casing, through which may be viewed two of the indicia on the wheels 12 and 13. The wheels 10 and 13 are units or low order wheels, while wheels 11 and 12 are tens or higher order wheels. The indicia of wheels 12 and 13 are arranged to be read from the rear of the device as when looking in the direction of arrow R of Fig. 1, and, hence, each indicium on each units and tens wheels of each pair is reversely arranged and disposed diametrically opposite the corresponding indicium of the corresponding wheel of the opposite pair. Hence, if wheels 10 and 11 indicate the quantity 60 through the respective sight opening when viewed in the direction of arrow F of Fig. 1, the wheels 12 and 13 will indicate the same value when viewed through the sight opening at the opposite side of the indicator. The indicator thus gives a dual display of any indicated value, quantity, or sum, since, as later described, the two pairs of wheels are arranged for such correlative movement as to present to view the same value at both sides of the indicator at any instant, whether the indicator is being, or has been actuated in a direction to increase or decrease a previously displayed value.

The wheels 11 and 12 are affixed to a hollow shaft 14 whereby said wheels will rotate in unison. The shaft 14 is mounted upon, and is rotatable relative to, a second hollow shaft 15 to which wheels 10 and 13 are fixed for rotation in unison therewith. The shaft 15 is mounted upon a shaft 16 which, for illustrative purposes, is shown journalled in end brackets 17 and 18 supported by a base 19. A plate 20 is disposed between wheels 10 and 11 and has a bifurcated end 21 which engages the head 22 of a stud 23 secured to the base 19, the plate 20 being thus retained against rotation. The plate carries a rotatable shaft 24 having a pinion on each end, the pinions being designated by the numerals 25 and 26. The wheel 10 is provided with a lug or projection 27 on a hub portion thereof, which is adapted to engage the teeth of the pinion 25 once during each rotation of the wheel 10 for effecting sufficient rotation of the shaft 24 whereby the pinion 26, which constantly meshes with a gear 28, formed on the wheel 11, effects rotation of the latter a distance corresponding to that between consecutive indicia thereon. In other words, rotation of wheel 10 through 360 degrees in either direction will produce rotation of wheel 11 through 36 degrees, or what may be termed a single step. This translating mechanism, as described, is conventional in counters and the structure disclosed for effecting transmission from the units wheel to the adjacent tens wheel, or from the latter to a hundredths wheel, when such is used, is for the purpose of illustration only.

As stated above, wheels 10 and 13 are secured to hollow shaft 15 and, hence, rotate in unison, both said wheels being the units wheels of the two groups of wheels. Also, as stated above, wheels 11 and 12 are secured to shaft 14 for rotation therewith, and, hence, when units wheel 10 is rotated to change the units value displayed at the front of the mechanism, the wheel 13 will be rotated the same angular distance and, hence, for a given movement from a given starting position the same new units will be displayed at both the front and rear of the mechanism through the respective sight openings above referred to. Whenever units wheel 10, through the translating mechanism above referred to comprising the shaft 24 and pinions 25 and 26 effects movement of tens wheel 11, a corresponding movement of wheel 12 will be effected by reason of the fact that wheels 11 and 12 move in unison by reason of their being fixedly mounted upon the shaft 14. Hence, if it be assumed that the wheels 10 and 11 are set at zero, with reference to the front sight opening, wheels 12 and 13 will likewise display two zeros at the rear sight opening. If wheel 10 is thereafter moved to bring the units value 5 into registration with the sight opening at the front of the machine, the units wheel 13 will move a corresponding distance and effect registration of units value 5 at the rear sight opening. If units wheel 10 is thereafter moved through an arc of 360 degrees it will pick up tens wheels 11 and 12 and move them one step whereby the numeral 1 will be displayed at each sight opening thus indicating dually, that is from both front and rear, the value 15. If the mechanism is in use on a parking meter, for example, the value 15 might indicate a fifteen minute parking period, although if used on a different type of apparatus, the value 15 may represent different units of value. If the units wheel 10 is moved in the opposite direction, that is, counterclockwise, as viewed in Fig. 2, the indicated value will decrease at each sight opening depending upon the distance through which the wheel 10 is moved. The mechanism thus can be operated in one direction to increase the indicated value at both sides of the machine from zero up to the maximum, or it can be operated in the opposite direction to effect a decrease in the indicated values at the two sides of the machine.

As stated above, hollow shaft 15 is not fixed to shaft 16, but coupling mechanism is provided whereby the units wheels 10 and 13 are moved continuously with the shaft 16 when the same is rotated clockwise as viewed in Fig. 2, but said wheels are rotated with a step by step movement when the shaft 16 is rotated in the counterclockwise direction as viewed in said figure. Hence, when the mechanism is rotated for effecting a decrease in the indicated values, the wheels shift suddenly with a step by step movement rather than continuously as when they are operated in the clockwise direction.

The mechanism for effecting actuation of the wheels in the two directions, as described above, comprises, in the structure shown in Figs. 1 to 6 inclusive, ratchets 29 and 30 which are shown as integral and rotatably mounted upon the shaft 16. The ratchet 30 is provided with ten equally spaced teeth 31 corresponding to the number of the digits that are equally spaced on the peripheries of the wheels 10 to 13 inclusive. Adjacent the ratchet 30 is a pawl operating member 32 shown as comprising a disc shaped member having a single notch in the periphery indicated by the numeral 33 and which provides a stop member 34. The base 35 of the notch 33 is shown arranged at a suitable inclination extending from the lower end of the stop 34 to the periphery of the member 32 and constitutes a cam or latch release means. The diameter of the member 32 is at least equal to, but preferably slightly larger than the diameter of the ratchet 30, that is, the circular edge of the disc 32 extends radially beyond the outer limits of the teeth 31 of the ratchet 30 for a purpose that will be obvious from a subsequent description of the operation of the mechanism. The disc shape of the member 32 is not essential to the operation of the mechanism, such form being shown merely for the reason that the disc member is a convenient form in which to provide the stop 34 and the inclined cam surface 35.

The member 32, as stated, is fixed to the shaft 16 as by a pin 36. A helical torsion spring 37 is shown attached at one end to the pin 36 and at the other end is anchored to an arm 38 which is fixed to the tubular shaft 15. To one end of the arm 38 is pivotally attached the inner end of a pawl 39, which extends outwardly (Figs. 1 and 3) over the peripheries of both the members 30 and 32. A spring 40 tends to retain the right hand or outer end of the pawl 39, as viewed in Fig. 3, in contact with the members 30 and 32, and, hence, in position for cooperation with the teeth 31 of member 30 and with the stop member 34 of member 32. A pawl 41 is provided for cooperation with the teeth of ratchet 29 for preventing counter-clockwise movement thereof as well as of ratchet 30. The pawl 41 is shown as being urged into tooth-engaging relation with the ratchet 29 by means of a spring 42, the pawl being pivotally mounted on the side wall 17. When the shaft 16 is rotated clockwise as viewed in Fig. 2, the member 32, being fixed to the shaft, rotates therewith. The pawl 39, being normally in contact with the stop 34 is likewise moved clockwise as is the ratchet 30 by reason of the engagement by pawl 39 with an adjacent tooth 31 of the ratchet as shown in Fig. 5. Since the arm 38, on which the pawl is mounted, is secured to the tubular shaft 15, it likewise is rotated clockwise and thus, as above described, the shaft 15 carries with it units wheels 10 and 13. The pawl 41 permits free operation of ratchet 30, member 32, the shaft 16, and the units wheels in the clockwise direction as described. Hence, if the shaft 16 is attached to suitable setting mechanism of an associated device, such as a parking meter, it may be rotated clockwise freely, as viewed in Fig. 2 by such setting mechanism to move the indicator wheels from original positions wherein they indicate zero on both sides of the mechanism to some predetermined setting. In a parking meter apparatus, such predetermined setting might be 15 to indicate a fifteen minute parking period, or 30 to indicate a thirty minute parking period, or as another example, 60 to indicate a one hour parking period.

If it be assumed that the indicator apparatus described is in fact used with a parking meter and is thus set at any one of several time indicating positions when the parking meter is initially actuated by a patron, as by inserting one or more coins therein, suitable mechanism will be provided for driving the shaft 16 by the meter in a counter-clockwise direction as viewed in Fig. 2. Such driving mechanism ordinarily will be a motor or clock or other time measuring instrumentality and will return the two pairs of indicating discs to indicate zero at the sight openings in the period of time respectively indicated by the numerals visible through those openings. During the counter-clockwise movement of the shaft 16, as mentioned, the pawl 41 restrains movement of the ratchet 29 and likewise restrains movement of the ratchet 30. Cam member 32, however, being fixed to the shaft 16, rotates with it and as viewed in Fig. 5, as the member 32 moves counter-clockwise, the cam surface 35 will swing the latching free end of the pawl 39 upwardly to a position (see the elevated dotted line position of Fig. 6) wherein the same is freed from the stationary adjacent tooth 31 of the ratchet 30 permitting the pawl to be moved, while in such elevated position, in a counter-clockwise direction. Upon such release of the pawl 39 by elevation of its outer end to clear the said tooth (identified as 31a) which in Fig. 6 is disposed immediately to the left of the pawl 39, the torsioned spring 37 will rotate the arm 38 and pawl 39 of shaft 15 counter-clockwise as viewed in Fig. 6. The diameter of the member 32 being slightly greater than the diameter of the ratchet 30 (measured through the teeth 31) the elevated pawl 39 can slide over the top of the adjacent stationary tooth 31a and move counter-clockwise under the action of the spring 37 until it is arrested by contact with the next counter-clockwise adjacent tooth (identified by reference character 31b). The stop 34 in the meantime will have moved into alignment with or beyond said next tooth 31b to the left or from the full line position to the counter-clockwise removed dotted line position shown in Fig. 6. In the said dotted line position shown in Fig. 6, the stop 34 is in registration with the forward face of said tooth 31b of the ratchet, which tooth thus momentarily arrests further arcuate movement of the pawl and likewise of the shaft 15 and the units wheels 10 and 13, notwithstanding that the cam member 32 is being rotated continuously by the shaft 16. However, the cam member 32 will again elevate the pawl 39 as the shaft 16 rotates and permit the spring to move it counter-clockwise over the top of tooth 31b into contact with the next tooth 31c and similarly with each succeeding tooth. The arcuate spacing between the teeth 31 of the ratchet 30 being such as to afford a movement of 36 degrees of arc of the pawl 39 insures that the units wheels 10 and 13 will be moved through a similar arc at each actuation thereof by the spring 37, the spring being tensioned for this purpose between successive movements of the pawl by the continuous movement of member 32.

Hence, the units wheels move with a step by step movement counter-clockwise as viewed in Fig. 2 to bring indicia of decreasing values successively into registration with the sight openings referred to.

Rotation of the units wheels 10 and 13 effects the picking up by said wheels of the "tens" wheels 11 and 12 to effect a one-step movement of the latter wheels for each complete rotation of the units wheels. Hence, if the indicator is initially set at 15 from an original zero position and the numeral 15 indicates a fifteen minute period, the indicated value will be decreased to zero in fifteen minutes, the units wheels moving with a step by step movement at the end of each minute. It will thus be seen that the shaft 16 is rotatable clockwise to effect a setting of the indicator wheels to provide a dual indication of a selected value and that the wheels are movable in the opposite direction by the reverse rotation of the shaft 16 to move the wheels back to indicate the original zero position.

In the modification of the invention shown in Figures 7–13, inclusive, the indicator wheel arrangement is similar to that shown in the preceding figures and the four wheels are designated 10 to 13, inclusive, as in the above modification, and the associated wheel parts are given the same reference characters as in the preceding form of the invention. The actuating means for the indicator wheels of the structure shown in Figs. 7–13 comprises a ratchet wheel 45 which is fixed to the tubular shaft 15 whereby rotation of the shaft in either direction directly effects the rotation of the units wheels 10 and 13. The ratchet 45 is provided with ten teeth 46 equally spaced about the periphery of the ratchet. Adjacent the ratchet is cam wheel 47 which is fixed to the shaft 16 as by a pin 48. The cam wheel 47 is provided with an arcuate slot 49 through which projects a pin 50 which is secured to the ratchet 45.

A spring 51 is secured at one end to a stud 52 (see Fig. 8), carried by the right hand face of the wheel as viewed in Fig. 9, while the other end of the spring is secured to the stud 50. The spring is tensioned so as to tend to move the ratchet 45 relative to the wheel 47 in a counter-clockwise direction as viewed in Fig. 8. A pawl 53, pivoted at 54 to an end plate of the structure, is provided with a spring 55 which tends to hold the latch tooth 56 of the pawl in engagement with the periphery of the ratchet 45 for engaging any of the teeth 46 of the ratchet for arresting counter-clockwise movement of the latter as viewed in Fig. 8. When the ratchet is operated in a reverse or clockwise direction, as viewed in Fig. 8, the latch 56 slides over the teeth without obstructing the free rotative movement thereof.

When the shaft 16 is operated clockwise by any suitable apparatus in connection with which the indicator mechanism is employed, the cam member 47 is rotated with the shaft since it is fixed thereto. The rotary movement of the shaft and member 47 is imparted to the ratchet 45 through the spring 51 and the stud 50 whereby such clockwise movement effects the rotation of the unit wheels 10 and 13 in the same direction, that is, in a direction whereby the units wheels will display values above the normal zero setting. Thus one and one-half complete rotations of the shaft will move the units wheels the same distance from a zero setting and display the digit 5 of each units wheel at each sight opening. However, at the end of the first complete rotation, wheel 10 will, by the mechanism above described, pick up the "tens" wheels 11 and 12 and move them one step whereby the value 15 will be displayed at the two sight openings.

Reverse movement, that is movement in a counter-clockwise direction of shaft 16 produces a step by step return movement of the units wheels so that if the return movement is one and one-half complete rotations, the indicator wheels each will display zero values at the sight openings. During such return or counter-clockwise movement, the pawl 53 will engage a tooth of the ratchet 45 and restrain movement thereof during the first 36° of arcuate movement of the shaft 16 and cam member 47. As the member 47 approaches the end of the first 36° of counter-clockwise movement, one of the ten cams 57 provided on the periphery of the cam wheel 47 will engage a roller 58 carried upon the adjacent side of the pawl 53 and swing the latter outwardly to effect release of the engaged tooth 46 from the latch 56. During such relative movement of the cam wheel 47 with reference to the pawl-retained ratchet 45, the spring 51 will have been tensioned by the movement of the stud 50 in a clockwise direction within the slot 49 as viewed in Fig. 8. When the pawl tooth that is so released by the latch 56 is free of the latter, the spring will move the ratchet 45 counter-clockwise as viewed in Fig. 8 a distance sufficient to effect engagement of the next tooth 46 with the latch 56 which will in the meantime have been restored by the spring 55 to tooth engaging position by reason of the movement of the actuating cam 57 out of contact with the roller 58. Hence continuous counter-clockwise movement of the shaft 16 produces step by step movement of the ratchet 45 in the same direction and similar movement of the units wheels 10 and 13 and, depending on the setting of the wheels, will effect also step by step counter-clockwise movement of the "tens" wheels 11 and 12. The movement of the "tens" wheels 11 and 12, of course, occurs at the rate of one step or 36° for each 360° movement of the units wheels. Thus in the mechanism described, as in the previously described modification, the indicator wheels 10 to 13, inclusive, are moved from zero to a set or value-indicating position with the movement of the shaft 16 in the clockwise direction, whereas upon return movement of the shaft, the wheels return with an interrupted or step by step movement. By reason of the step by step movement of the indicator wheels during the counter-clockwise movement of the shaft 16, the values indicated by said wheels are altered quickly, rather than progressively. In a parking meter such movements of the indicator wheels occur at the termination of the time units represented by the displayed values.

In the form of the invention shown in Figs. 14 to 19, inclusive, the indicator wheel mechanism is similar to the forms above described and the parts are given like identifying reference characters. In this form, however, the tubular shaft 15 is provided with a radially extending arm 60 adjacent the units wheel 10, the outer end of the arm 60 being longitudinally slotted for receiving a pin 61 which is carried by a pawl 62. The pawl 62 is pivoted intermediate its ends as at 63 to the arms of a U-shaped bracket 64 which is secured to the shaft 16 as by a screw 65 whereby the bracket and pawl rotate with the shaft 16. The lower end of the pawl, as viewed in Fig. 18, is connected by a tensioned spring 66 to the base of the U-shaped bracket 64 and thus tends to swing the pawl 62 clockwise about its pivotal axis 63, as viewed in Fig. 18. A ratchet 67 is mounted on shaft 16 but is not fixed thereto and is provided with teeth 68 which project laterally to the left of the body of the ratchet wheel, as viewed in Fig 14, for cooperating with the pawl 62.

A pawl 69, pivoted at 70 to a bracket 17, is arranged to engage one of the teeth 68 of the ratchet wheel 67 to prevent rotation of the wheel when the shaft 16 is rotated in counter-clockwise direction, as viewed in Fig. 15. When the shaft 16 is rotated in a clockwise direction, the pawl 69 does not prevent rotation of the ratchet. It will be seen that when the shaft 16 is rotated in a counter-clockwise direction, as viewed in Fig. 18, the ratchet 67 rotates with the shaft, since the ratchet is not locked by pawl 69 from movement in that direction. The outer end of the pawl 62 is arranged to engage the laterally projecting ends of the teeth 68, and, hence, when shaft 16 is rotated counter-clockwise (Fig. 18), the pawl 62 moves the ratchet 67 with it. Hence in such counter-clockwise movement of the shaft 16, the units wheels 10 and 13 are movable with the shaft. The counter-clockwise movement in Fig. 18 mentioned is the direction of movement of the shaft which effects the setting of the indicator wheels to indicate some particular value, the value being determined by the extent of movement of the shaft. If units wheels are rotated more than one rotation the wheel 10 will pick up the "tens" wheels 11 and 12 and move them one step from a zero position for each complete rotation of the units wheels. On the reverse or clockwise movement of the shaft (Fig. 18), the pawl 69 will engage one of the teeth 68 of the ratchet and restrain the wheel from such clockwise movement. The bracket 64, however, being fixed to the shaft, will move in a clockwise direction with the shaft and in so moving (see Fig. 18) the pawl 62 will be swung counter-clockwise about its pivot 63 to enable the outer end of the pawl to be drawn in succession beneath successive teeth 68. Thus the pawl in swinging from the full line position to the dotted line position of Fig. 18 effects movement of the pin 61 radially inwardly from the full line position to the dotted line position shown in said Fig. 18. Thus the pawl 62 is maintained in driving engagement with the arm 60 during clockwise movement of the shaft 16. During this swinging of the pawl 62 counter-clockwise with reference to its pivot 63, the spring 66 is further tensioned and as the outer end of the pawl 62 is freed from engagement with a tooth at the inner periphery of the latter, the spring 66 snaps the pawl 62 in a clockwise direction about its pivot 63 which movement is imparted by the pin 61 to the arm 60, and thus effects quick movement of the tubular shaft 15 which carries the units wheels 10 and 13. The distance that the pawl 63 is moved by the spring 66 as it is freed from one tooth 68 until it is engaged by the next adjacent tooth 68 is 36°, and, hence, the units wheels 10 and 13 are moved through a similar arc or a distance sufficient to reveal in the sight openings the next lower values on the wheels. Thus the units wheels on clockwise movement of the shaft 16 as viewed in Fig. 18 produce an interrupted or step by step movement of the indicator wheels.

The step by step movements of the wheels in the three structures shown are in a direction for decrementally varying the displayed values while movement of the wheels in the opposite direction incrementally vary the displayed values. The pawl and ratchet means shown constitute a coupling between the drive shaft 16 and the shaft 15 of the three structures illustrated, the coupling imparting to the shaft 15 continuous movement during the setting operation when the shaft 16 is so operated, but translates continuous movement of shaft 16 in the reverse direction into interrupted or step by step movement in shaft 15 during return movement of the indicator members to zero position. It will be seen that the number of teeth on the ratchets as well as the number of cam formations 57 on member 47 preferably correspond to the number of digits on the indicator wheels whereby the operation of the parts are properly coordinated and the digits or the pairs of digits that indicate a selected value or that indicate decremental values, will always be in proper registration with the sight openings of the indicator casing.

As indicated above, the structures illustrated may be employed for various purposes, depending on the character of apparatus with which the structures, or any of them, may be employed. The shaft 16 which is the driving means of each of the structures shown may be operated clockwise in a single operation or in a succession of operations for displaying a selected value at both sides of the indicator apparatus whether that value requires the setting of the low order wheels 10 and 13 or values which require also the entraining of wheels of a higher order. If used in conjunction with a parking meter, for example, of a type adapted to receive a 5¢ piece in payment for a one hour parking period, and adapted also to receive 1¢ pieces each in payment for a 12 minute parking period, the coin-energized mechanism of such meter will be such as to rotate the shaft 16 clockwise a distance to display the value 60 at the sight opening on the front and rear of the mechanism when a 5¢ piece is inserted, or the values 12, 24, 36, 48 and 60 when one, two, three, four, or five 1¢ pieces are inserted in succession. The reverse operation of the shaft 16 will produce decremental operation of the indicator wheels, that is, movement from the set value toward zero value.

While structures illustrative of the invention have been shown and described, variations of such structures may be utilized within the spirit of the invention.

I claim:

1. Indicator apparatus comprising a pair of rotary indicator members operable forwardly and rearwardly between a zero position and a position indicating a selected value, means connecting said members for movement in unison, one of said members having the value indicia thereon arranged to be read from one side of the apparatus, the other said member having the indicia thereon arranged to be read from the other side of the apparatus, the indicia of said members being arranged for indicating corresponding values in all positions of operation thereof, a member for effecting rotation of the indicators from zero positions to positions indicating selected values and vice versa, and a pawl and ratchet mechanism actuatable by said member for effecting a step by step movement of the indicators upon operation thereof in the latter of said directions.

2. Indicator apparatus comprising a pair of rotary indicating wheels, a hollow shaft to which said wheels are secured for operation in unison, said wheels having indicia arranged thereon for indicating corresponding values at opposite sides of the apparatus in all positions of rotation of said wheels, a drive shaft supporting said hollow shaft for relative rotary movement, and means for effecting driving relation between said shafts for producing continuous rotary movement of said wheels upon continuous rotary movement of said drive shaft in one direction, and for producing an interrupted rotary movement of said wheels upon continuous rotary movement of said drive shaft in the opposite direction.

3. Indicator apparatus comprising rotary indicator means provided with two peripherally arranged rows of similarly spaced indicia thereon arranged for indicating corresponding values at selected positions on opposite sides of the apparatus in all positions of rotation of said means, a rotary actuating member, mechanism operably connecting said means with said actuating member for transmitting continuous movement from said member to said means upon continuous movement of said member in one direction, and means cooperating with said mechanism for producing movement of said indicator means in the opposite direction in steps corresponding to the spaces between successive indicia of said rows upon continuous movement of said means in said opposite direction.

4. Indicator apparatus comprising a pair of low order wheels and a pair of higher order wheels, means securing the low order wheels together for movement in unison, means securing the higher order wheels together for movement in unison, the wheels of each pair having peripherally spaced value indicia thereon for indicating concurrently corresponding values at the front and rear of the apparatus in all positions of rotation of said wheels, means for transmitting motion from the low order wheels to the higher order wheels upon completion of a rotation of the low order wheels in either direction from a given position, an actuating member, coupling means effecting driving engagement of said actuating member with said low order wheels for rotating the latter in one direction upon rotation of said actuating member in one direction, and means cooperating with said coupling means for effecting interrupted operation of the low order wheels in the reverse direction upon reverse movement of said actuating member.

5. In the indicator apparatus comprising a pair of connected counter wheels having value indicia thereon reversely arranged, each for indicating corresponding values, at opposite sides of the indicator in all positions of rotation thereof, a drive member operable in two directions, and mechanism coupling the drive member to the wheels for effecting driving relation of said member with said wheels comprising means for effecting a continuous driving relation of said wheels by said drive member upon operation of the latter in one direction, and means for effecting a step by step movement of said wheels in the opposite direction upon operation of the drive member in the other direction.

6. In the indicator apparatus comprising a pair of connected counter wheels having value indicia thereon reversely arranged, each for indicating corresponding values, at opposite sides of the indicator in all positions of rotation thereof, a drive member operable in two directions, and mechanism coupling the drive member to the wheels for effecting driving relation of said member with said wheels comprising means for effecting a continuous driving relation of said wheels by said drive member upon operation of the latter in one direction, and power storing pawl and ratchet means for effecting a step by step movement of said wheels in the opposite direction upon operation of the drive member in the other direction.

7. In an indicator, a pair of connected counter wheels having equally spaced indicia thereon for indicating incremental values when operated in one direction and for indicating decremental values when operated in the opposite direction, the indicia of one of said wheels being reversely arranged with respect to the indicia of the other wheel for indicating corresponding values at opposite sides of the indicator in all positions of rotation of said wheels, a drive member operable in two directions, and coupling means for effecting driving relation of said drive member with said wheels for effecting uniform movement of the wheels in one direction for indicating successive incremental values at both sides of the machine during such movement of the drive member in said direction and for effecting movement of the wheels in the opposite direction in a series of equal steps corresponding to the spacing of said indicia for indicating decremental values from both sides of the machine during movement of said drive member in the other direction.

8. Indicator apparatus comprising rotary means operable forwardly and rearwardly, said means having indicia thereon arranged for indicating corresponding values at opposite sides of the apparatus in all positions of rotation of said means, a member coupled to said rotary means and operable continuously in one direction for effecting the operation of said rotary means in one direction for indicating incremental values and operable continuously in the opposite direction for effecting operation of said rotary means in the opposite direction for indicating decremental values, and means actuatable by said member for producing a step by step movement of said rotary means upon operation thereof in the direction for indicating decremental values.

DAVID C. ROCKOLA.

REFERENCES CITED

The following references are of record in the file of this patent:

UNITED STATES PATENTS

| Number | Name | Date |
|---|---|---|
| 1,169,424 | Ohmer et al. | Jan. 25, 1916 |
| 1,503,698 | Mettler | Aug. 5, 1924 |